United States Patent Office 2,916,621
Patented Dec. 8, 1959

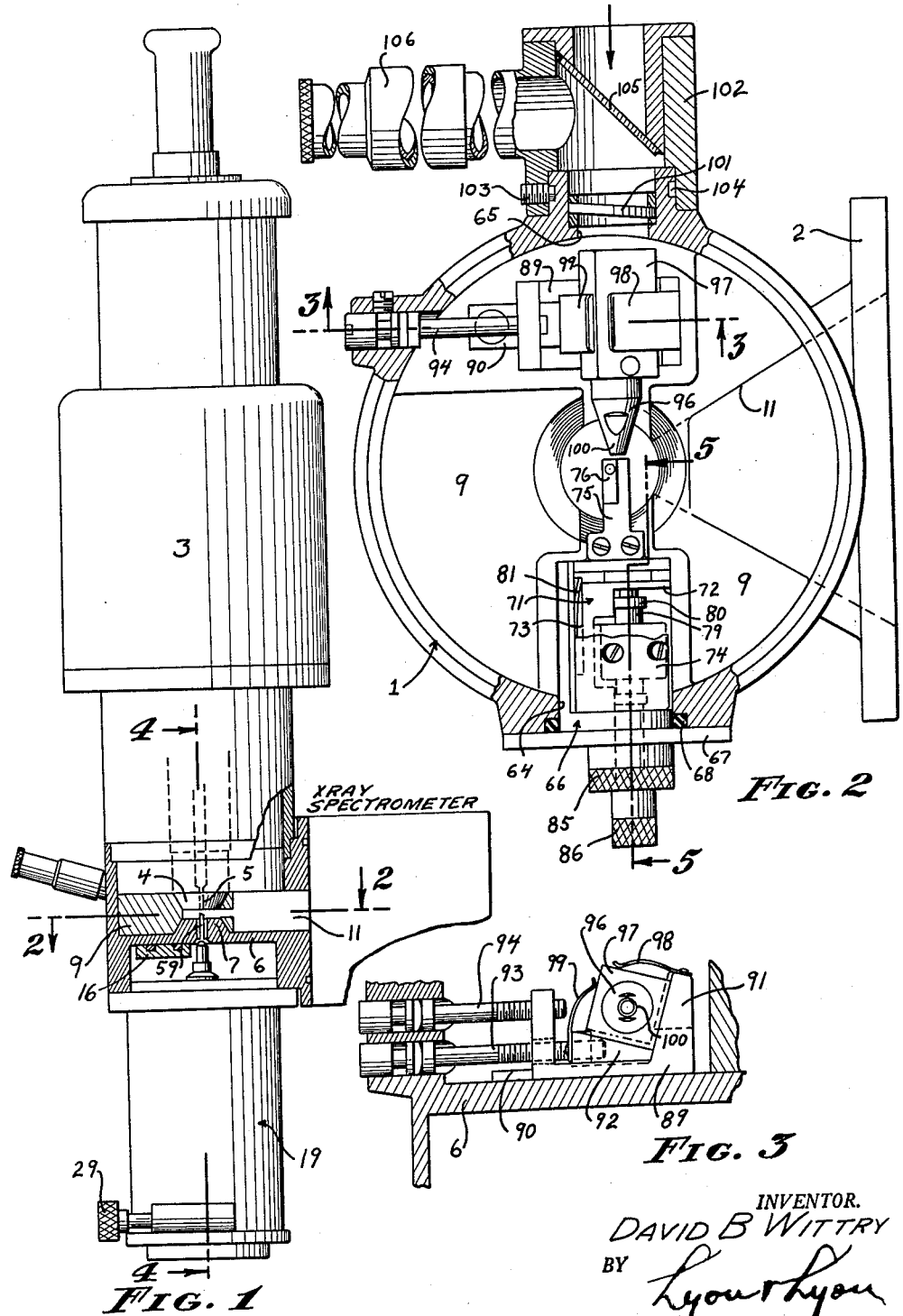

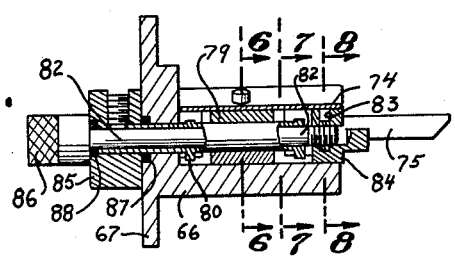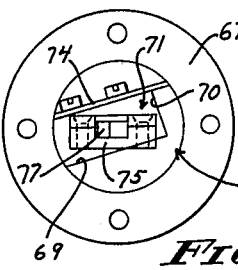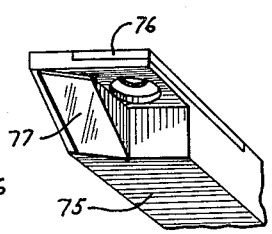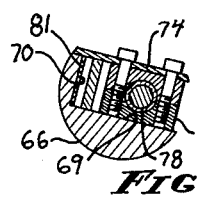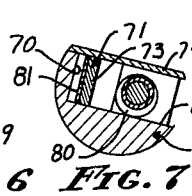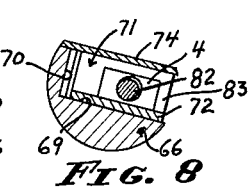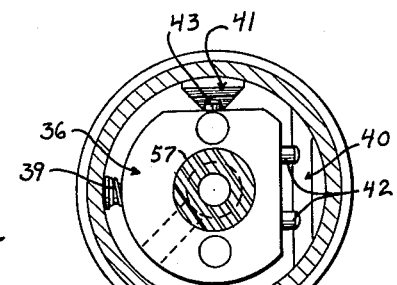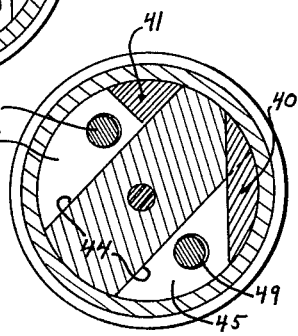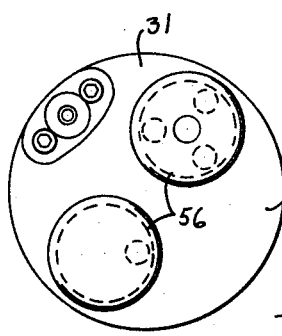

2,916,621

ELECTRON PROBE MICROANALYZER

David B. Wittry, Pasadena, Calif., assignor to California Institute Research Foundation, Pasadena, Calif., a corporation of California Application April 24, 1958, Serial No. 730,651

7 Claims. (Cl. 250—49.5)

This invention relates to electron probe microanalyzers, that is to apparatus wherein a focused electron beam is caused to strike a specimen and the resulting X-radiation is analyzed to determine the composition of a small volume of the specimen, that is a volume in the order of 10 to 30 cubic microns or less.

Included in the objects of this invention are:

First, to provide an electron probe microanalyzer wherein a magnetic lens focusing system for the electron beam and the optical focusing system are so interrelated that the objective of the optical system is disposed in the gap of the magnetic lens to permit optical observation of the specimen undergoing electron bombardment and thereby to permit accurate correlation between the point of optical observation, and the point of electronic bombardment, and the corresponding X-ray intensity.

Second, to provide an electron probe microanalyzer wherein an electron focusing system of extremely short focal length may be employed whereby the necessary demagnification of the electron beam can be obtained by a single magnetic lens and whereby the spherical aberration coefficient of said electron beam can be minimized so as to obtain a larger electron current on very small regions than can be obtained with existing electron probe microanalyzers.

Third, to provide an electron probe microanalyzer which is readily adapted to the use of an air lock to permit insertion and removal of the specimen.

Fourth, to provide an electron probe microanalyzer capable of chemically analyzing minute quantities of solid materials, if such materials are nonmetallic, a thin metallic film being employed and if ferro-magnetic, the specimen being sufficiently small as to minimize distortion of the magnetic field.

Fifth, to provide an electron probe microanalyzer wherein the position specimen may be readily adjusted without disturbing the optical arrangement, and wherein the specimen may be manipulated to effect a rotation thereby to change the effective emergence angle of the X-rays from the specimen in order to obtain data for determining the self-absorption correction of the material comprising the specimen.

With the above and other objects in view as may appear hereinafter, reference is directed to the accompanying drawings in which:

Figure 1 is a partial sectional, partial side view of the electron probe microanalyzer showing particularly the electron gun, electron lens and the specimen mounting unit but omitting the X-ray spectrometer and associated electronic equipment.

Figure 2 is an enlarged transverse sectional view through 2—2 of Figure 1 with the electron gun and the electron lens removed and with portions shown in plan.

Figure 3 is a fragmentary sectional view through 3—3 of Figure 2 showing the mounting means for the optical objective unit.

Figure 5 is a longitudinal sectional view of the aperture and mirror mounting unit taken substantially along the line 5—5 of Figure 2.

Figure 6, 7 and 8 are transverse sectional views thereof taken respectively through 6—6, 7—7 and 8—8 of Figure 5.

Figure 9 is an end view of the aperture and mirror mounting unit.

Figure 10 is an enlarged fragmentary, perspective view showing the tip of the aperture and mirror mount.

Figure 4:
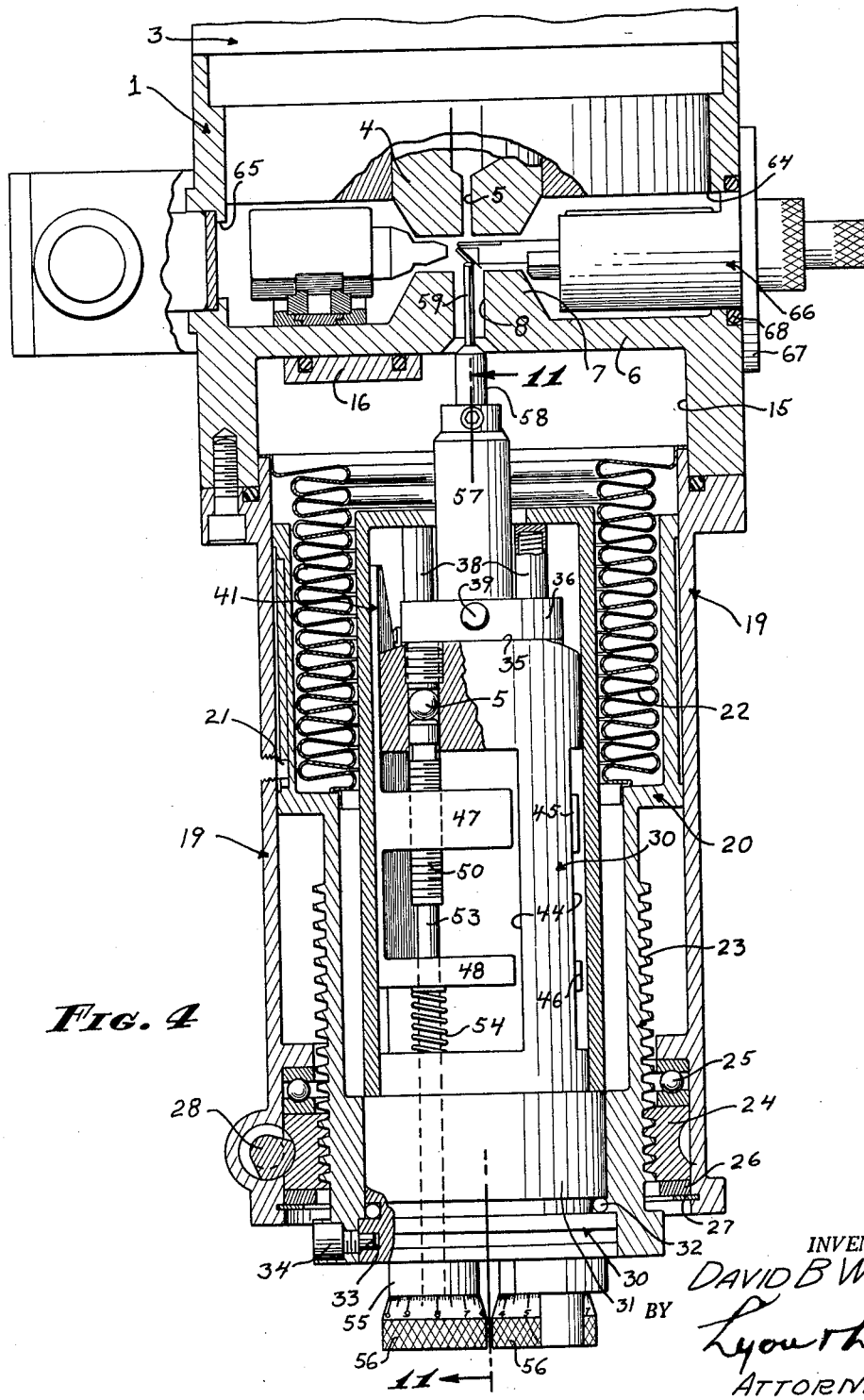
Figure 4 is an enlarged fragmentary longitudinal sectional view with portions in elevation taken through 4—4 of Figure 1.

Figure 11 is a partial sectional, partial elevational view of the specimen supporting assembly taken substantially along the lines 11—11 of Figure 4.

Figure 12 is a bottom end view of the specimen mounting assembly.

Figures 13 and 14 are transverse sectional views thereof taken through 13—13 and 14—14 of Figure 11.

Figure 15:
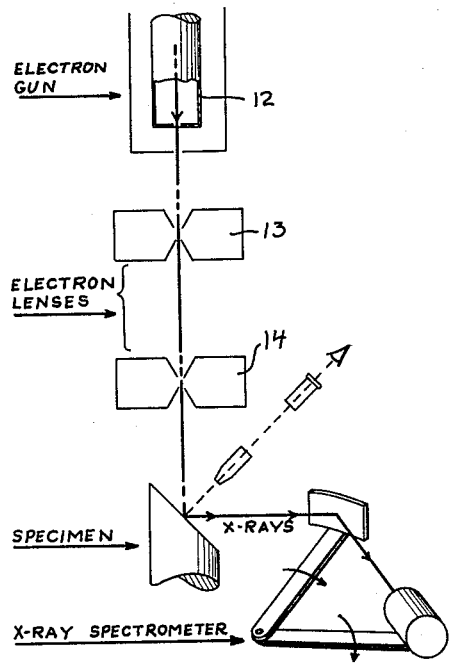

Figure 15 is a diagrammatical view showing the relationship of the electron gun specimen and X-ray spectrometer.

Figure 16:
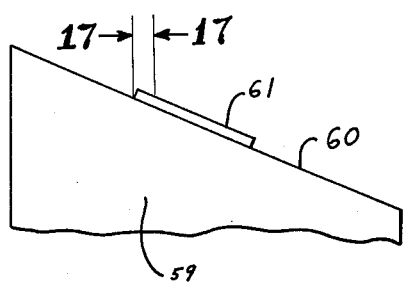

Figure 16 is a fragmentary, exaggerated sectional view of a specimen and its support.

Figure 17:
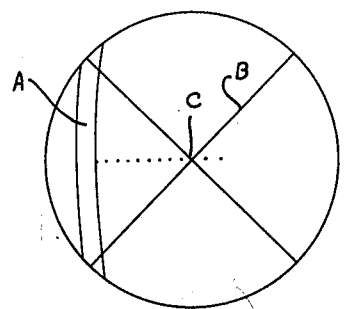

Figure 17 is a view of a specimen as it appears when viewed through the eyepiece of the optical system, the view being taken in the region 17—17 of Figure 16.

Figure 18:
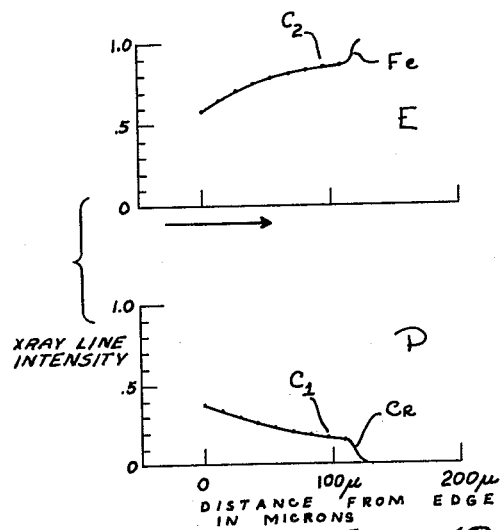

Figure 18 is a dual graph representing the analysis of a specimen having a plating of chromium on iron and representing the proportions of chromium and iron at various points inwardly from the plating, in which the horizontal axis represents the distance from the edge of the specimen in microns and the vertical axis represents the X-ray line intensity derived from the X-ray spectrometer.

The electron probe microanalyzer includes a housing structure 1 of generally cylindrical form having at one side a mounting bracket 2 adapted to be mounted on the side of a casing, not shown, in which is located an X-ray spectrometer which for the purposes of the present invention may be considered as conventional. Supported by the housing structure 1 is an electron gun assembly 3 which includes an upper pole piece 4 which projects into the housing structure and is centered therein. The upper pole piece is provided with a bore 5 of small dimensions through which the electron beam is discharged. Below the pole piece 4 the housing structure includes a partition 6 in which is centered a lower pole piece 7. The lower pole piece is also provided with a bore 8 of somewhat larger dimensions than the bore 5 and through which is inserted the specimen to be studied as will be described hereinafter. Within the housing structure above the partitioned one is pole positioning block 9. The pole positioning block 9 is provided with a window slot 11 in registry with the space between the pole pieces 4 and 7 and diverging radially outward through the mounting bracket 2 for the purpose of permitting the discharge of X-rays into the X-ray spectrometer.

The electron gun assembly 3 may be considered as conventional. As represented in Figure 15 the electron gun assembly includes an electron gun 12 and suitable electron focussing lenses 13 and 14 so that an electron beam of small diameter may be directed through the bore 5 to strike a specimen located between the upper and lower pole pieces.

With reference to Figures 4 and 11, the housing structure 1 forms under the partition 6 a cavity 15. Mounted in the cavity 15 is a sealing gate 16 having an axis of movement at one side of the pole pieces so that it may be moved between a position laterally of the bore 8 and a position concentric with the bore 8 so that in the latter position a high vacuum may be maintained in the region between the pole pieces and above the partition 6.

The under side of the housing structure 1 supports a specimen holder housing 19 in the form of a depending cylinder. Slidably mounted within the housing 19 is a specimen holder sleeve 20 which is secured against rotation by a slot and key means 21. A bellows 22 having multiple corrugations forms a vacuum seal between the specimen holder housing 19 and the specimen holder sleeve 20. The lower portion of the sleeve 20 is reduced in diameter and provided with external screw threads 23. Adjacent the lower end of the holder housing 19 there is mounted a worm gear ring 24 which engages the screw thread 23. The worm gear ring is mounted between a thrust bearing 25 and a retainer bearing 26 secured in place by a retainer ring 27. One side of the housing 19 at its lower end is laterally enlarged and provided with a tangential bore to receive a worm drive 28 which may be operated by a handle 29.

Mounted within the sleeve 20 is a specimen holder assembly which includes a generally cylindrical pedestal 30 and which includes a base 31 journalled within the lower portion of the holder sleeve 20. A seal connection is afforded between the base and sleeve by means of an annular seal ring 32. Below the seal ring the base 31 is provided with a groove 33 which receives a pin 34 extending inwardly from the lower portion of the sleeve 20. The pin and the groove not only retain the pedestal and its base in position, but also permit rotation relative to the sleeve.

The upper end of the pedestal 30 forms a guide surface 35 which, for reasons which will be brought out hereinafter, is inclined. Mounted on the guide surface 35 is a slide block 36. The pedestal 30 is encased in a shell 37 having an apertured upper end which overlies the slide block 36. Vertical spring elements 38 interposed between the slide block 36 and the upper end of the shell 37 urge the slide block against the guide surface 35. Horizontal spring element 39 is interposed between the slide block 36 and the side wall of the shell 37 to urge the slide block in a downward direction along the guide surface 35. Mounted at right angles to each other are translation wedges 40 and 41. The translation wedge 40 is located at the lower side of the guide surface 35 whereas the translation wedge 41 is located laterally thereof. Bearing pins 42 and 43 extend from slide block 36 to engage the translation wedges 40 and 41 respectively. The translation wedges 40 and 41 extend downwardly alongside the pedestal 30, the pedestal being cut away to accommodate the wedges. In addition, the pedestal is provided with recesses 44 in its opposite sides. Extending from the translation wedges 40 and 41 into these recesses are upper bosses 45 and 47 and lower bosses 46 and 48. A pair of adjustment screws 49 and 50 extend longitudinally within the recesses 44. The upper bosses 45 and 47 are screw threaded for engagement with the adjustment screws. The upper end of the adjustment screws engage thrust bearings 51. The lower portions of the adjustment screws form stems 52 and 53 which extend through and journal in the lower bosses 46 and 48. Interposed between the base 31 and the lower bosses 46 and 48 are springs 54 fitted around the stems and arranged to apply an upward bias on the translation wedges 40 and 41. The lower extremities of the stems protrude from the bottom of the base 31 and through sealing collars 55. The extremities of the stems are secured to dials 56.

Mounted on the slide block 36 is a mounting post 57 formed of insulating material. The mounting post supports a mounting terminal 58 in which is adapted to be mounted a specimen supporting stem 59. A specimen supporting stem is provided with an inclined upper axial extremity or surface 60 which is parallel to the sloping guide surface 35. The specimen 61 to be studied is cemented or otherwise secured to the inclined surface 60.

Whereas, in many instances the specimen is mounted on the stem 59, in other instances the stem itself may constitute the specimen or more accurately the inclined surface 60 as an integral part of the specimen.

An electrical lead 62 extends downwardly from the terminal 58 through a bore provided in the pedestal 30 and base 31 and terminates in an external terminal 63.

Reference is now directed to Figure 2 and to Figures 5 through 10. The housing structure 1 is provided with lined apertures 64 and 65 disposed on an axis at right angles to the window 11. The axis is also located slightly above and slightly to one side of the specimen 61 when positioned in the electron beam. Mounted in the aperture 64 and extending toward the specimen is an aperture disc and mirror supporting assembly which includes a generally cylindrical body member 66. One end of the body member is provided with a flange 67 which seats against a boss surrounding the aperture 64. A seal ring 68 is provided adjacent the flange 67 which fits within a counter bore provided in the aperture 64 for the purpose of sealing the body member 66 with respect to the housing structure 1.

Inwardly of the seal ring 68 the body member is cut away to form a tilted or inclined surface 69 which is parallel with the inclined surface 60 on which the specimen 61 is mounted. The tilted surface 69 is bordered by a side wall 70 at right angles thereto. Mounted for limited axial movement on the body member 66 is a supporting frame 71 which is generally L-shaped including an end portion 72 extending across the end of the body member 66 and a stem portion 73 extending along the side wall 70. A retainer plate 74 overlies the supporting frame and rests on the side wall 70.

Removably secured to the end portion 72 of the supporting frame is a small bracket 75 which extends toward the specimen. The bracket 75 extends to a position intersecting the electron beam between the pole pieces. Cemented or otherwise mounted on the bracket 75 is an aperture disc or plate 76 having a small aperture therein intended to be disposed concentrically with respect to the electron beam. The bracket 75 is provided with a clearance aperture under the aperture in the aperture disc 76 as denoted in Figure 10.

Supported by the bracket 75 at the under side thereof and at one side of the aperture disc or plate 76 is a small mirror 77. The orientation of the mirror 77 is such that the inclined surface 70 of the specimen supporting stem 59 may be observed from an optical axis which is substantially coincident with the axis defined by the apertures 64 and 65. The mirror is associated with an optical system which will be described hereinafter.

Extending axially through the body member 66 and above the surface 69 is a sleeve 78 which passes through a bearing 79 secured to the tilted surface 69. The bearing 79 may serve as the support for the retainer plate 74. Mounted on the sleeve 78 at opposite ends of the bearing 79 is a pair of cams 80 which are arranged to engage the stem portion 73 of the supporting frame 71 for the purpose of moving the supporting frame in the plane of the tilted surface 69 and in a direction transverse to the axis of the body members. A leaf spring 81 interposed between the stem portion 73 and the side wall 70 maintains the stem portion in yieldable engagement with the cams 80.

The sleeve 78 journals a shaft 82 which extends into the end portion 72. The end portion 72 is provided with a slot 83 in which is mounted a nut 84. The axes of the slot 83 is at right angles to the axes of the body members 66 so that irrespective of lateral adjustment of the supporting frame the shaft 82 may rotate in the nut for the purpose of advancing and retracting the supporting frame 71 axially with respect to the body member 66.

The sleeve 78 and the shaft 82 protrude from the flanged end of the body member 66 and are provided respectively with a dial 85 and a knob 86. The knob 86 protrudes axially from the dial so that the sleeve 78 and the shaft 82 may be rotated independently. Seal rings 87 and 88 are provided to seal the sleeve and shaft respectively.

Reference is now directed to Figures 2 and 3 and particularly the optical system therein. Mounted on the partition 6 between the specimen 61 and the aperture 65 is a base slide 89 which is guided for movement on an axis at right angles to the axis defined by the apertures 64 and 65, by means of a guide strip 90. The base slide includes an end wall 91, the surface of which is disposed at right angles to the inclined surface 60 of the specimen supporting stem 59 when forming a vertical angle with the axis of the window 11. Slidably mounted on the base slide 89 is a wedge slide 92 having a surface which is parallel with the inclined surface 60. The base slide 89 and wedge slide 92 are provided with screw leads 93 and 94 which extend through the side wall of the housing structure 1 and are provided with suitable sealing rings. The exposed extremities of the screw leads may be provided with suitable dials or may be slotted to receive a screw driver, inasmuch as adjustment of the base slide and wedge slide is only infrequently required. An objective unit 96 having a body portion 97 which may be square in cross section rests on the wedge slide 92 and bears against the end wall 91 and is maintained in yieldable engagement therewith by leaf springs 98 and 99. The tip 100 of the objective unit extends into the space between the pole pieces 4 and 7 into close proximity to the specimen but offset therefrom so that the upper surface of the specimen may be observed through the mirror 77.

Fitted within the aperture 65 is a sealed window 101 preferably disposed at a slight angle to minimize reflection. Externally of the aperture 65 the housing structure 1 is provided with a boss on which is rotatably mounted a collar 102 which may be secured in position by a set screw 103 adapted to ride in an annular groove 104. Mounted within the collar 102 at a 45° angle to the axes of the objective unit 96 is a partially silvered mirror 105. The extended end of the mounting collar 102 is open so that a light source, not shown, may be directed axially through the partially silvered mirror 105 through the objective unit 96 and reflected by mirror 77 on to the inclined surface 60 of the specimen supporting stem 59. The mounting collar supports at right angles to its axes an adjustable draw tube 106 and conventional eyepiece 107 which utilizes the partially silvered mirror 105 to permit observation of the specimen 61.

Adjustment of the electron probe microanalyzer is as follows:

The microanalyzer is sealingly connected by the mounting bracket 2 to a casing, not shown, containing an X-ray spectrometer indicated diagrammatically in Figure 15. Prior to operation of the microanalyzer the interior of the housing structure 1 as well as the interior of the casing containing the X-ray spectrometer is evacuated. This is done with the sealing gate 16 in its position closing the bore 8 or with the specimen substantially in the position for observation. The specimen is positioned by operation of the adjustment screws 49 and 50 by means of their dials 56.

By operation of the specimen holder assembly the specimen may be adjusted along the axis between the apertures 64 and 65 or at right angles to this. By reason of the inclination of the guide surface 35 which is parallel to the inclined surface 60, movement is confined to the plane defined by the inclined surface 60. Adjustment of the specimen is made while it is under observation through the optical system.

Also prior to the operation of the microanalyzer the aperture disc and mirror supporting assembly is adjusted until the aperture in the aperture disc is co-axially disposed relative to the electron beam. This aperture is positioned as closely as possible before operation of the electron beam but final adjustment may be made while the electron beam is functioning. However, this is preferably done with a fluorescent screen in the specimen position. After adjustment of the microanalyzer is completed, selected minute areas of the specimen 61 are analyzed.

The use of the electron probe microanalyzer in a typical application is as follows:

For example, the specimen to be analyzed may be a specimen of iron, which has been impregnated with a diffused layer of chromium by the process known as chromizing. It is desired to measure the concentration of chromium and of iron at various points across a section of this specimen. Accordingly, the specimen was first plated with a layer of nickel the purpose of which is to prevent rounding of the edge of the section when this section is polished for observation in the electron probe microanalyzer.

The surface which is to be analyzed must be free of irregularities in order to avoid errors which might occur from the self-absorption of the X-rays. The specimen itself may be in the form of a rod with the impingement surface to be analyzed having the proper slope, or the specimen may be cemented or otherwise secured to the end of a specimen supporting rod. Figure 16 is an exaggerated fragmentary side view of the supporting rod 60 and a speciment 61 thereon.

Figure 17 shows a view of a portion of the chromized iron specimen as would be seen through the viewing system of the microanalyzer representing the area between 17—17 of Figure 16. The protective layer of nickel plating A is seen in edge view. The specimen is translated by means of the mechanical stage until a desired region such as B coincides with the intersection of the cross hairs C of the optical system which have previously been aligned so as to indicate the point of impact of the electron probe.

The electron beam is then turned on and the intensity of the $K\alpha 1$ X-ray line of chromium is recorded. After correction for dead time of the detector, and either self-absorption of fluorescence excitation as may be required this intensity is divided by the similarly corrected intensity which was obtained on a specimen of pure chromium. The result is equal to the mass concentration of chromium at a point C on the specimen, and furnishes one point $C_1$ on the curve D of Figure 18 wherein the mass concentration of chromium is plotted as a function of distance from the edge of the section of the specimen.

This procedure is repeated for the iron $K\alpha 1$ X-ray intensity of iron originating from the same region C of the specimen and furnishes one point $C_2$ on the curve of E of Figure 18 wherein is plotted the mass concentration of iron as a function of distance from the edge of the section of the specimen.

In a like manner, the composition may be measured at a series of points lying at various distances from the edge as denoted in the two curves comprising Figure 18. While these compositions are based on the use of pure iron and pure chromium as standards, it is clear that one could also use alloys of known composition as standards provided that they were homogeneous.

It is advantageous in some cases to use other X-ray lines in the spectrum than the $K\alpha 1$ lines for the analysis. For example, in the case of elements of high atomic number it would be preferable to use the $L\alpha 1$ lines.

Having thus described certain embodiments and applications of my invention, I do not desire to be limited thereto, but intend to claim all novelty inherent in the appended claims.

I claim:

1. An electron probe microanalyzer, comprising: means means defining a sealed cavity having a window for passage of X-rays; a pair of confronting pole pieces within said cavity, one of said pole pieces having a passage for an electron beam, the other of said pole pieces having a coaxial specimen clearance opening for insertion of a specimen between said pole pieces; means for passing a focused electron beam through said electron beam passage; means for adjustably supporting a specimen between said pole pieces in position for emission through said window of X-rays produced by said electron beam on striking said specimen; means for adjustably supporting a mirror in proximity to said specimen and means for adjustably supporting an optical objective in position for viewing the image of said specimen reflected by said mirror in the region struck by said electron beam.

2. An electron probe microanalyzer, comprising: a pair of confronting pole pieces; means for positioning a specimen between said pole pieces; means for passing a focused electron beam through one of said pole pieces to impinge on said specimen; means laterally of said pole pieces for detecting X-ray emission from said specimen; a mirror between said pole pieces contiguous to said specimen for reflecting the image of said specimen laterally of said pole pieces; and optical apparatus utilizing said reflected beam for observing said specimen.

3. An electron probe microanalyzer, comprising: a pair of confronting pole pieces; means for positioning a specimen between said pole pieces with its surface disposed in a plane oblique to the axis defined by said pole pieces, whereby said surface is exposed in a direction laterally of said pole pieces; means for passing a focused electron beam through one of said pole pieces to impinge on said specimen; means to which the oblique surface of said specimen is exposed for detecting X-ray emission from said specimen; an aperture disc disposed in said electron beam over said specimen; a mirror contiguous to said disc for reflecting the image of said specimen in a direction laterally of said pole pieces; a mirror between said pole pieces contiguous to said specimen for reflecting the image of said specimen laterally of said pole pieces.

4. An electron probe microanalyzer, comprising: means defining a sealed cavity having a window for passage of X-rays; a pair of confronting pole pieces within said cavity one of said pole pieces having a passage for an electron beam; means for positioning a specimen having an impingement surface oblique to the axis of said electron beam and obtusely related to said window; said means including position adjustment mechanisms to move said specimen in a plane parallel with said impingement surface; means for supporting a mirror adjacent said specimen for reflecting said impingement surface; said means including position adjustment mechanisms to move said mirror in a plane parallel to said impingement surface; and optical means for viewing an image of said impingement surface as reflected by said mirror, said means including mechanism for positioning said optical means for viewing selected areas of said impingement surface.

5. An electron probe microanalyzer, comprising: means defining a sealed cavity having a window for passage of X-rays; a pair of confronting pole pieces within said caivty, one of said pole pieces having a passage for a focused electron beam, the other of said pole pieces having a specimen receiving aperture; means for inserting and removing a specimen through said aperture and for disposing a specimen so as to present to said electron beam an impingement surface oblique to the axis of said electron beam and obtusely related to said window; mechanisms for moving said specimen in two directions within a plane parallel with said impingement surface; means for supporting a mirror adjacent said specimen for reflecting said impingement surface; said means including position adjustment mechanisms to move said mirror in a plane parallel to said impingement surface; and optical means for viewing an image of said impingement surface as reflected by said mirror, said means including mechanisms for positioning said optical means for viewing selected areas of said impingement surface.

6. An electron probe microanalyzer, comprising: means defining a sealed cavity having a window for passage of X-rays; means for supporting an electron beam aperture element and a mirror in fixed relation to each other, the mirror being disposed to reflect the impingement surface of said specimen; mechanisms for adjusting said means in two directions within a plane parallel to the impingement surface of said specimen; and optical means for viewing an image of said impingement surface as reflected by said mirror, said means including mechanisms for positioning said optical means for viewing selected areas of said impingement surface.

7. An electron probe microanalyzer, comprising: means for producing a focused electron beam; means for positioning a specimen in said beam to present an impingement surface disposed obliquely to the axis of said beam; means for detecting X-ray emanations from said impingement surface; mechanism for moving said specimen relative to said electron beam in a plane parallel to said impingement surface; a mirror for reflecting said impingement surface; mechanism for moving said mirror in a plane parallel to said impingement surface; optical means for viewing an image of said impingement surface reflected by said mirror; and mechanism for moving said optical means parallel to and perpendicular to said impingement surface.

References Cited in the file of this patent
UNITED STATES PATENTS

| | | |
|---|---|---|
| 2,359,290 | Von Borries et al. | Oct. 3, 1944 |
| 2,418,029 | Hillier | Mar. 25, 1947 |
| 2,418,228 | Hillier | Apr. 1, 1947 |